(12) United States Patent
Henry

(10) Patent No.: US 9,888,622 B2
(45) Date of Patent: Feb. 13, 2018

(54) AIR FLOW CONTROL OF A DISTRIBUTION HEAD FOR AGRICULTURAL PRODUCTS

(71) Applicant: CNH Industrial Canada Ltd., Saskatoon, Saskatchewan (CA)

(72) Inventor: James W Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 257 days.

(21) Appl. No.: 14/563,488

(22) Filed: Dec. 8, 2014

(65) Prior Publication Data

US 2016/0157418 A1    Jun. 9, 2016

(51) Int. Cl.
*A01C 7/08* (2006.01)

(52) U.S. Cl.
CPC .............. *A01C 7/084* (2013.01); *A01C 7/081* (2013.01); *A01C 7/082* (2013.01)

(58) Field of Classification Search
CPC combination set(s) only.
See application file for complete search history.

(56) References Cited

U.S. PATENT DOCUMENTS

| | | | |
|---|---|---|---|
| 4,479,444 A * | 10/1984 | Takata | F16L 41/03 111/118 |
| 5,967,066 A * | 10/1999 | Giles | A01C 23/024 111/119 |
| 5,996,516 A | 12/1999 | Benneweis et al. | |
| 6,296,425 B1 | 10/2001 | Memory et al. | |
| 6,505,569 B1 | 1/2003 | Richard | |
| 6,644,225 B2 | 11/2003 | Keaton | |
| 7,162,962 B2 | 1/2007 | Fuessel et al. | |
| 8,001,914 B2 | 8/2011 | Peterson et al. | |
| 2001/0048037 A1 * | 12/2001 | Bell | A01C 23/042 239/70 |
| 2005/0076818 A1 * | 4/2005 | Grimm | A01C 23/024 111/119 |
| 2010/0313801 A1 * | 12/2010 | Peterson | A01C 7/102 111/130 |
| 2011/0035163 A1 | 2/2011 | Landphair | |
| 2011/0313572 A1 * | 12/2011 | Kowalchuk | A01C 7/205 700/275 |
| 2012/0036914 A1 | 2/2012 | Landphair et al. | |
| 2012/0174843 A1 | 7/2012 | Friggstad | |
| 2012/0312211 A1 | 12/2012 | Hubalek et al. | |

* cited by examiner

*Primary Examiner* — Alicia Torres
(74) *Attorney, Agent, or Firm* — Rebecca L. Henkel; Rickard K. DeMille

(57) ABSTRACT

An air flow control system for an agricultural product delivery system includes a sensor. The sensor is disposed within, along, or just before a secondary distribution manifold for measuring an air flow pressure therein. The sensor generates a signal in response to the air flow pressure in the secondary distribution manifold. The air flow control system also includes a controller which is operatively connected to the sensor. The controller is configured to receive the signal and to adjust the air flow pressure to the secondary distribution manifold in response to the signal.

22 Claims, 9 Drawing Sheets

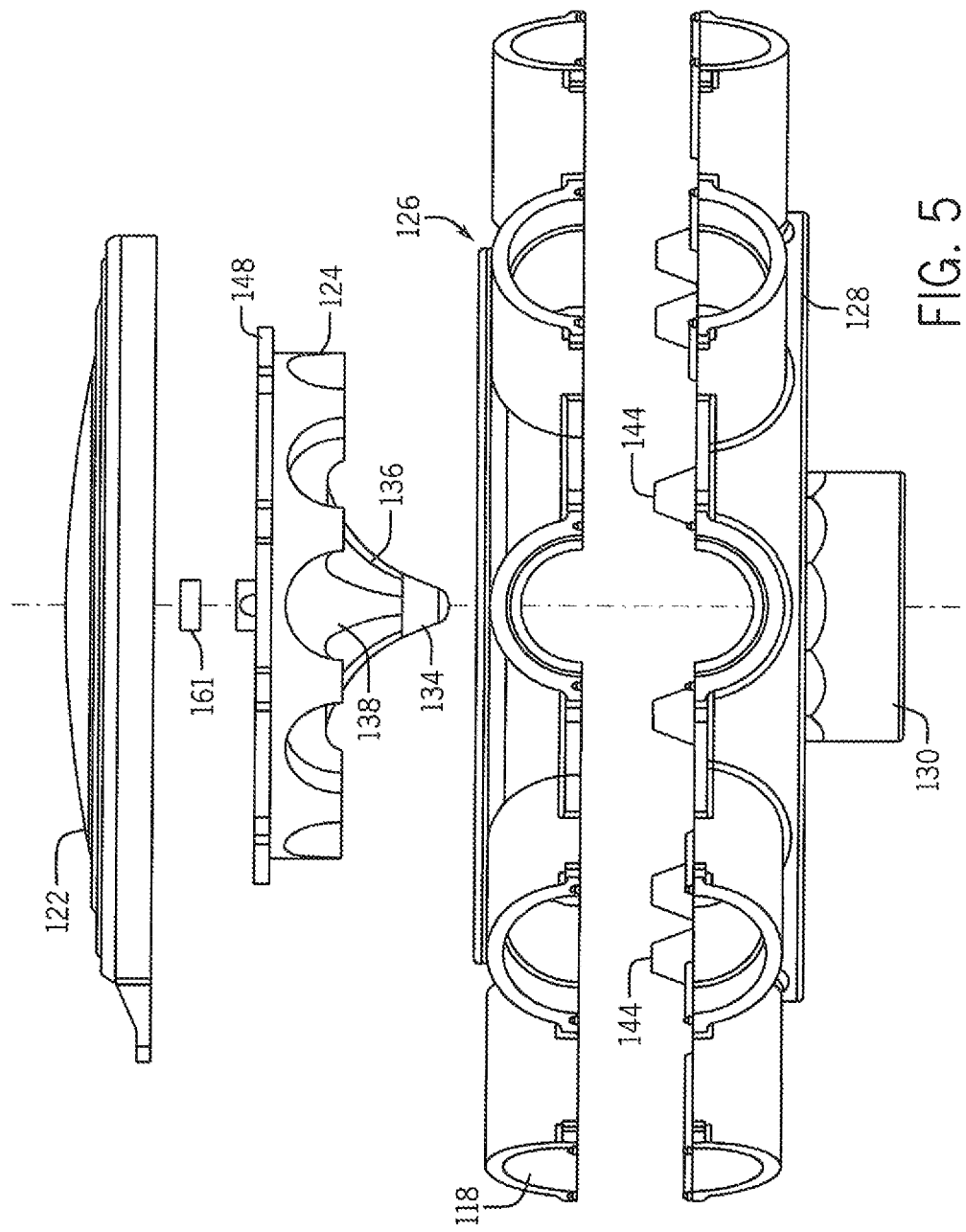

AIR FLOW CONTROL OF A DISTRIBUTION HEAD FOR AGRICULTURAL PRODUCTS

FIELD OF THE INVENTION

The invention relates generally to the delivery of agricultural products to an agricultural field, and in particular, to an air flow control for delivering agricultural products to an agricultural field using a pneumatic system.

BACKGROUND OF THE INVENTION

Conventional agricultural seeders are often employed to deposit planting material into soil. Many seeders include a material dispensing implement that is towed behind a tractor or similar vehicle for distributing planting material, such as seed, fertilizer, pesticide, and other chemicals and materials, onto a furrowed farmland or similar planting surface. The implement may consist of multiple dispensing units or opener units that are supported by a common or shared frame that is towed by the tractor.

Agricultural seeders may include one or more ground engaging tools or openers that form a seeding path for planting material deposition into the soil. The openers are used to break the soil to enable seed deposition. After the planting material is deposited, each opener is followed by a packer wheel that packs the soil on top of the deposited material. Seeders commonly use pneumatic systems to transport planting material from a storage hopper to the soil to be deposited. Typically, air flow is provided through tubes or distribution lines to transport product therethrough.

In certain configurations, an air cart is used to meter and transport the planting material (e.g., seeds, fertilizer, etc.) to ground engaging tools within the seeding implement. The air cart may include a hopper having one or more compartments configured for holding various planting material. Certain air carts include a metering system configured to deliver metered quantities of material into a tube or distribution line that transfers the material to the openers. The metering system will control distribution from the one or more compartments of the hopper to distribution lines such that each compartment provides planting material at a desired rate. Typically, an air cart includes a single large fan powered by a single motor, which supplies air flow to all distribution lines for pneumatic delivery of the planting material therethrough. From the distribution lines, air flow is diverted into primary distribution manifolds that then feed secondary distribution lines, which then deliver the planting material toward individual openers and row units of a drill.

To provide consistent delivery rates across the drill, distribution lines are typically the same length, regardless of the distance between the row units they feed and its corresponding feeding header or the air cart. Common lengths of distribution lines to provide flow consistency by keeping pressure the same in the different distribution lines. This can lead to excessively long distribution lines feeding rows that are closer to the headers or air cart, which can clutter the drill with hoses, increase manufacturing costs and increase setup time.

In view of the foregoing, it can be appreciated that it is highly desirable to provide an air flow control for maintaining an equal air flow pressure to row units of a drill without requiring lengthy distribution lines.

Therefore, it is a primary object and feature of the present invention to provide an air flow control with the ability to vary volume of air supplied to the product distribution lines.

It is a further object and feature of the invention to provide an air flow control which provides for greater detection and elimination of plugs in the product distribution It is a still further object and feature of the invention to provide an air flow control wherein the length of the product distribution lines utilized is minimized.

SUMMARY OF THE INVENTION

In accordance with the present invention, a control system is provided for an agricultural product delivery system including a fan for generating an air flow, a primary distribution manifold in communication with the fan, a secondary distribution manifold in communication with the primary distribution manifold, and a plurality of row units in communication with the secondary distribution manifold. The control system includes a sensor disposed within, along, or just before the secondary distribution manifold for measuring an air flow pressure in the secondary distribution manifold and generating a signal in response to the air flow pressure in the secondary distribution manifold. A controller is operatively connected to the sensor and configured to receive the signal and to adjust the air flow pressure in the secondary distribution manifold in response to the signal.

The secondary distribution manifold includes a distribution head extending along a central axis and the sensor is disposed in the distribution head coincident with the central axis. It is contemplated for the sensor to be a load cell. The secondary distribution manifold also includes a cover and a spring clip for retaining the cover on the distribution head. The sensor may be positioned within the distribution head in axial alignment with the spring clip. In addition, the secondary distribution manifold may includes second spring clip for retaining the cover on the distribution head and the control system may include a second sensor disposed in the secondary distribution manifold for measuring the air flow pressure in the secondary distribution manifold and generating a signal in response to the air flow pressure in the secondary distribution manifold. The second sensor is positioned within the distribution head in axial alignment with the second spring clip. The controller is operatively connected to the second sensor and is configured to receive the signal from second sensor and to adjust the air flow pressure in the secondary distribution manifold in response to the second signal. The controller is configured to at least one of increase and decrease a rotational speed of fan in response to the first and second signals.

The primary distribution manifold may include a restriction element selectively adjusting the volume of air flow supplied to the secondary distribution manifold. The controller is operatively connected to the restriction element and is configured to adjust the volume of air supplied to the secondary distribution manifold in response to the signal in order to adjust the air floss pressure in the secondary distribution manifold.

In accordance with a further aspect of the present invention, an agricultural product delivery system is provided. The agricultural product delivery system includes a storage container holding a product and a first distribution line adapted for receiving product from the storage container. A first fan is in communication with the first distribution line and is configured such that rotation of the first fan generates an air flow in the first distribution line which entrains and carries the product downstream in the first distribution line. A primary distribution manifold has an inlet in communication with the first distribution line and a plurality of outlets. The primary distribution manifold is configured to receive the product entrained in the air flow at the inlet and to divide the product entrained in the air flow into portions of product entrained in the air flow at the outlets of the primary distribution manifold. A first secondary distribution manifold has an inlet in communication with a first outlet of the plurality of outlets of the primary distribution manifold for receiving a first portion of product entrained, in the air flow and an outlet in communication with a row unit. A first sensor is disposed in the first secondary distribution manifold for measuring an air flow pressure in the first secondary distribution manifold and for generating a first signal in response to the air flow pressure in the first secondary distribution manifold. A controller is operatively connected to the first sensor and is configured to receive the first signal and to adjust the air flow pressure in the first secondary distribution manifold in response to the first signal.

The first secondary distribution manifold includes a distribution head having a central axis. The first sensor may be positioned in the distribution head coincident with the central axis. It is contemplated for the first sensor to be a load cell. The first secondary distribution manifold also includes a cover and a spring clip for retaining the cover on the distribution head. The first sensor may be positioned adjacent to the cover and in axial alignment with the spring clip.

A second sensor may be disposed in the first secondary distribution manifold for measuring the air flow pressure in the first secondary distribution manifold and generating a second signal in response to the air flow pressure in the first secondary distribution manifold. A second spring clip retains the cover on the distribution head. The second sensor may positioned within the distribution head adjacent the cover and axially aligned with the second spring clip.

A second secondary distribution manifold has an inlet in communication with a second outlet of the plurality of outlets of the primary distribution manifold for receiving a second portion of product entrained in the air flow and an outlet in communication with a second row unit. A second sensor may be disposed in the second secondary distribution manifold for measuring an air flow pressure in the second secondary distribution manifold and for generating a second signal in response to the air flow pressure in the second secondary distribution manifold. The controller is operatively connected to the second sensor and configured to receive the second signal and to adjust the air flow pressure in the second secondary distribution manifold in response to the second signal.

It is contemplated for the fan have an adjustable rotatable speed and for the controller to be configured to adjust the rotatable speed of the fan in response to the first signal. In addition, the primary distribution manifold includes a restriction element in communication with the first outlet thereof and being selectively adjustable to adjust the volume of air flow entraining the first portion of product exiting the first outlet. The controller is operatively connected to the restriction element and is configured to adjust the restriction element in response to the first signal in order to adjust the air flow pressure in the secondary distribution manifold.

In accordance with a still further aspect of the present invention, an agricultural product delivery system is provided. The agricultural product delivery system includes a storage container holding a product and a first distribution line adapted for receiving product from the storage container. A fan is in communication with the first distribution line and configured such that rotation of the fan generates an, air flow in the first distribution line which entrains and carries the product downstream in the first distribution line. A primary distribution manifold has an inlet in communication with the first distribution line and a plurality of outlets. The primary distribution manifold is configured to receive the product entrained in the air flow at the inlet, and to divide the product entrained in the air flow into portions of product entrained in the air flow at the outlets of the primary distribution manifold. A first restriction element is in communication with the first outlet of the primary distribution manifold and is selectively adjustable to adjust the volume of air flow entraining the first portion of product exiting the first outlet. A second restriction element is in communication with the second outlet of the primary distribution manifold and is selectively adjustable to adjust the volume of air flow entraining the second portion of product exiting the second outlet. A first secondary distribution manifold has an inlet in communication with a first outlet of the plurality of outlets of the primary distribution manifold for receiving a first portion of product entrained in the air flow and an outlet in communication with a first row unit. A second secondary distribution manifold has an inlet in communication with a second outlet of the plurality of outlets of the primary distribution manifold for receiving a second portion of product entrained in the air flow and an outlet in communication with a second row unit. A first sensor system is disposed in the first secondary distribution manifold for measuring an air flow pressure in the first secondary distribution manifold and generating a first signal in response to the air flow pressure in the first secondary distribution manifold. A second sensor system disposed in the second secondary distribution manifold for measuring an air flow pressure in the second secondary distribution manifold and generating a second signal in response to the air flow pressure in the second secondary distribution manifold. A controller is operatively connected to the first and second sensors, the first and second restriction elements and the fan. The controller is configured to receive the first and second signals and to adjust the air flow pressures in the first and second secondary distribution manifolds in response to the first and second signals.

The first secondary distribution manifold includes a distribution head having a central axis. The first sensor may be positioned in the distribution head and be coincident with the central axis. Similarly, the second secondary distribution manifold includes a distribution head having a central axis. The second sensor may be positioned in the distribution head of the second secondary distribution manifold and be coincident with the central axis of the second secondary distribution manifold. It is contemplated for the first and second sensors to be load cells.

The first secondary distribution manifold may also include a cover and a spring clip for retaining the cover on the distribution head. The first sensor may be positioned adjacent to the cover and in axial alignment with the spring clip. The second secondary distribution manifold may also include a cover and a spring clip for retaining the cover of the second secondary distribution manifold on the distribution head of the second secondary distribution manifold. The second sensor may be positioned adjacent to the cover of the second secondary distribution manifold in axial alignment with the spring clip of the second secondary distribution manifold.

The fan has an adjustable rotatable speed and the controller is configured to adjust the rotatable speed of the fan in response to the first and second signals. In addition, the controller is operatively connected to the first and second restriction elements and is configured to adjust the first restriction element in response to the first signal and configured to adjust the second restriction element in response to the second signal.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 5 is an exploded, side elevational view of a distribution head of the secondary distribution manifold of FIG. 3;

DETAILED DESCRIPTION OF THE DRAWINGS

Figure 1:
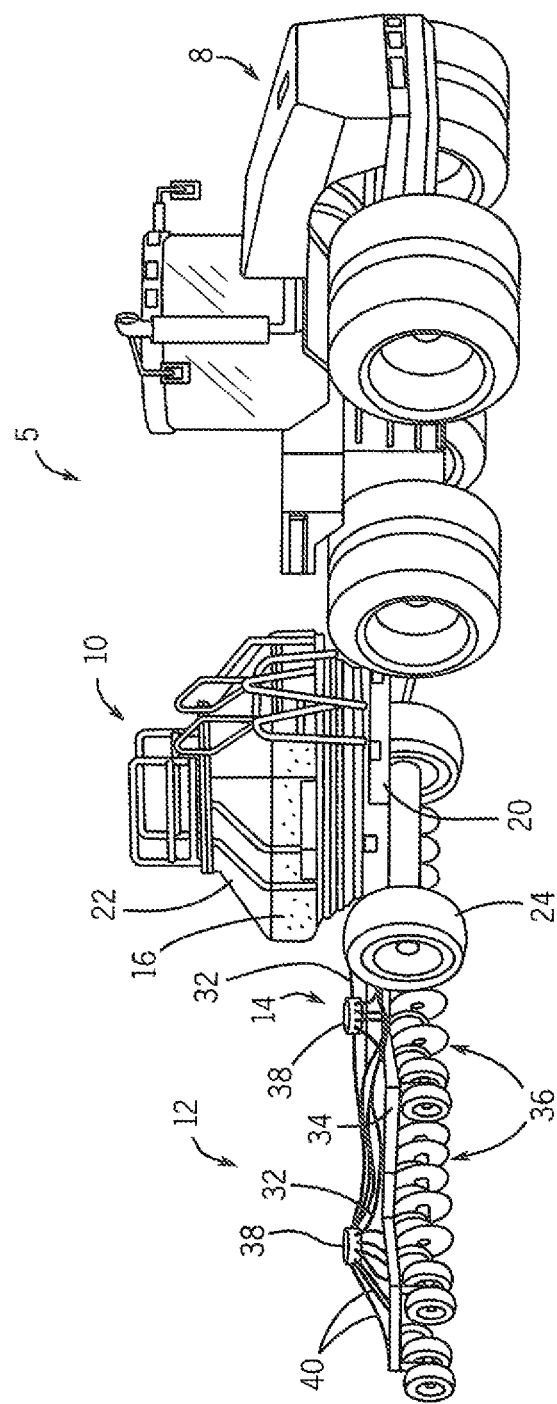
FIG. 1 is an isometric view of a tractor pulling an implement and to an air cart assembly including an air flow control in accordance with the present invention.

Referring to FIG. 1, an agricultural particulate material delivery system 5 is shown that includes a tractor 8 and an agricultural air cart assembly 9. The agricultural air cart assembly 9 includes, e.g. an air cart 10 such as a PRECISION AIR® cart available from the Case IH company, and a material dispensing implement, e.g. a drill 12. As is conventional, the drill 12 includes a frame 34 to which a set of row units 36 is coupled. By way of example, the row units 36 may take the form of a plurality of disc-style opener units 36a, FIG. 1, or a plurality of tip-type opener units 36b, FIG. 2. The row units 36 are configured to cut a furrow into the soil and deposit the product 16 therein. Seed row finishing equipment such as wheel packers or closing wheels 42 may be arranged on the drill 12, such as the embodiment shown in FIG. 2 for closing the furrow(s).

The air cart 10 and the drill 12 are hitched to the tractor 8 and/or each other in a conventional manner. The agricultural air cart assembly 9 further includes a pneumatic distribution system 14 operatively connected to the air cart 10 and the drill 12 for pneumatically delivering product 16 from the air cart 10 to the drill 12 for pneumatic distribution of the product 16 to an agricultural field. By way of example, the product 16 is a particulate material that may be seed, such as small grains, and/or fertilizer, such as dry granular fertilizer.

As hereinafter described, a controller (not shown) is configured to control distribution of the product 16 from the storage compartments 22 of the air cart 10 to the drill 12. It is contemplated for an operator to enter the configuration of the agricultural air cart assembly 9 into the controller and the desired operating parameters thereof. This configuration may be entered manually, for example, from a pull-down menu presented to the operator. Optionally, the agricultural air cart assembly 9 may include an identifier and the controller may be configured to automatically detect the identifier and determine the agricultural air cart assembly 9 connected to the tractor 8. The controller may include an industrial computer or, e.g., a programmable logic controller (PLC), along with corresponding software and suitable memory for storing such software and hardware, for controlling various components of the agricultural air cart assembly 9, as hereinafter described. A database stored in a memory device may include additional configuration parameters such as the number of storage compartments 22 present on the air cart 10, the number of row units 36 of the drill 12 and the like.

Figure 2:
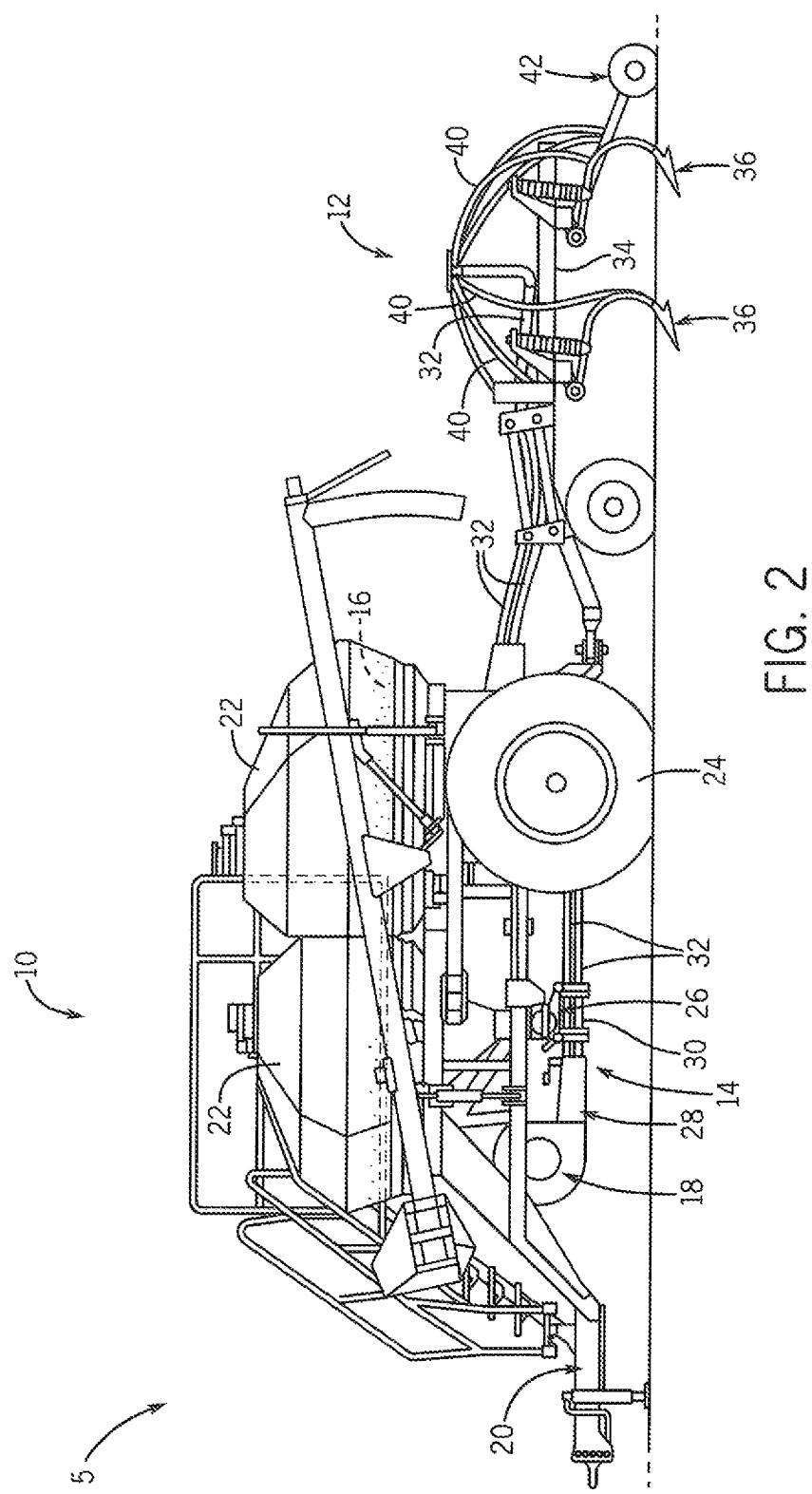
FIG. 2 is a side view of the agricultural air cart and an alternate implement including an air flow control in accordance with the present invention.
Figure 3:
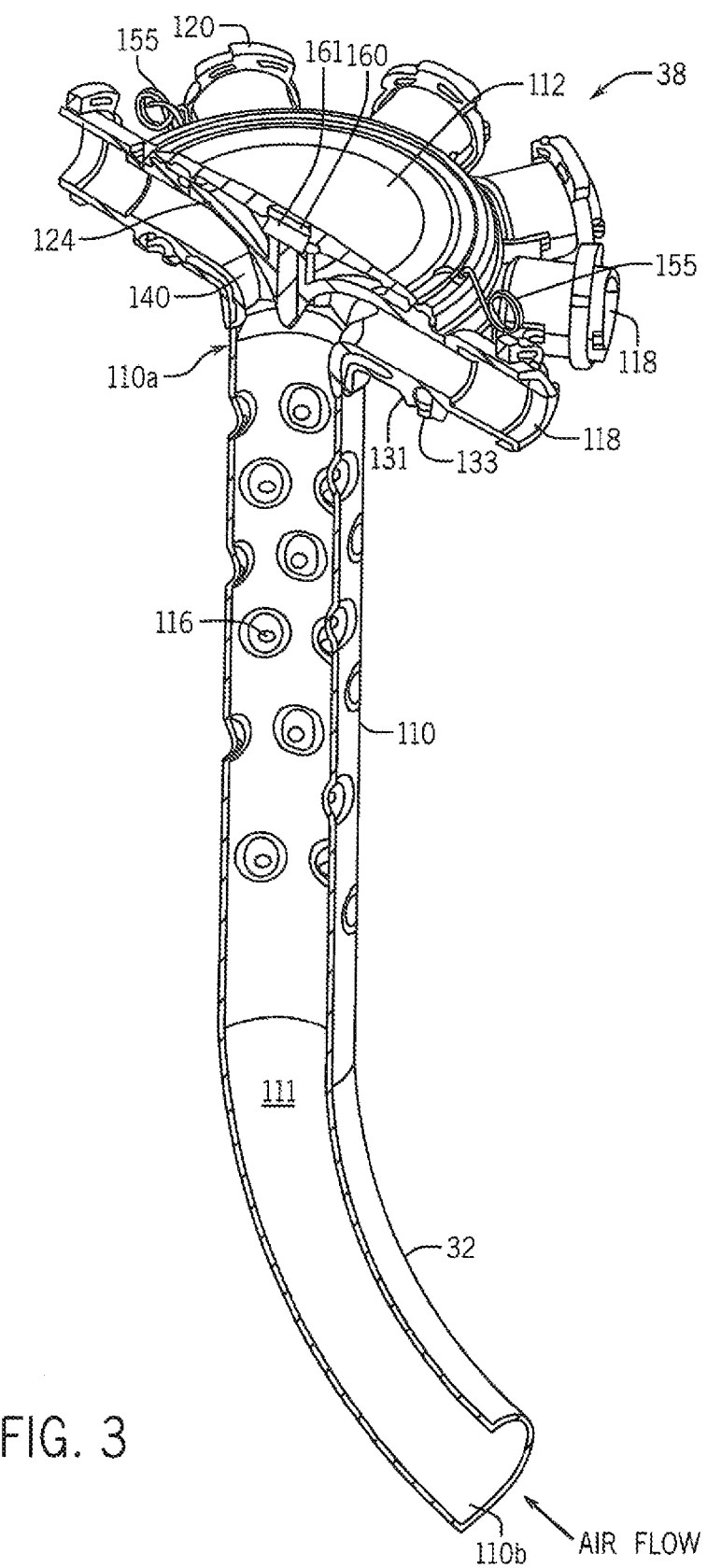
FIG. 3 is an isometric view of a cross-section of a secondary distribution manifold including a sensor system for the air flow control of the present invention.
Figure 4:
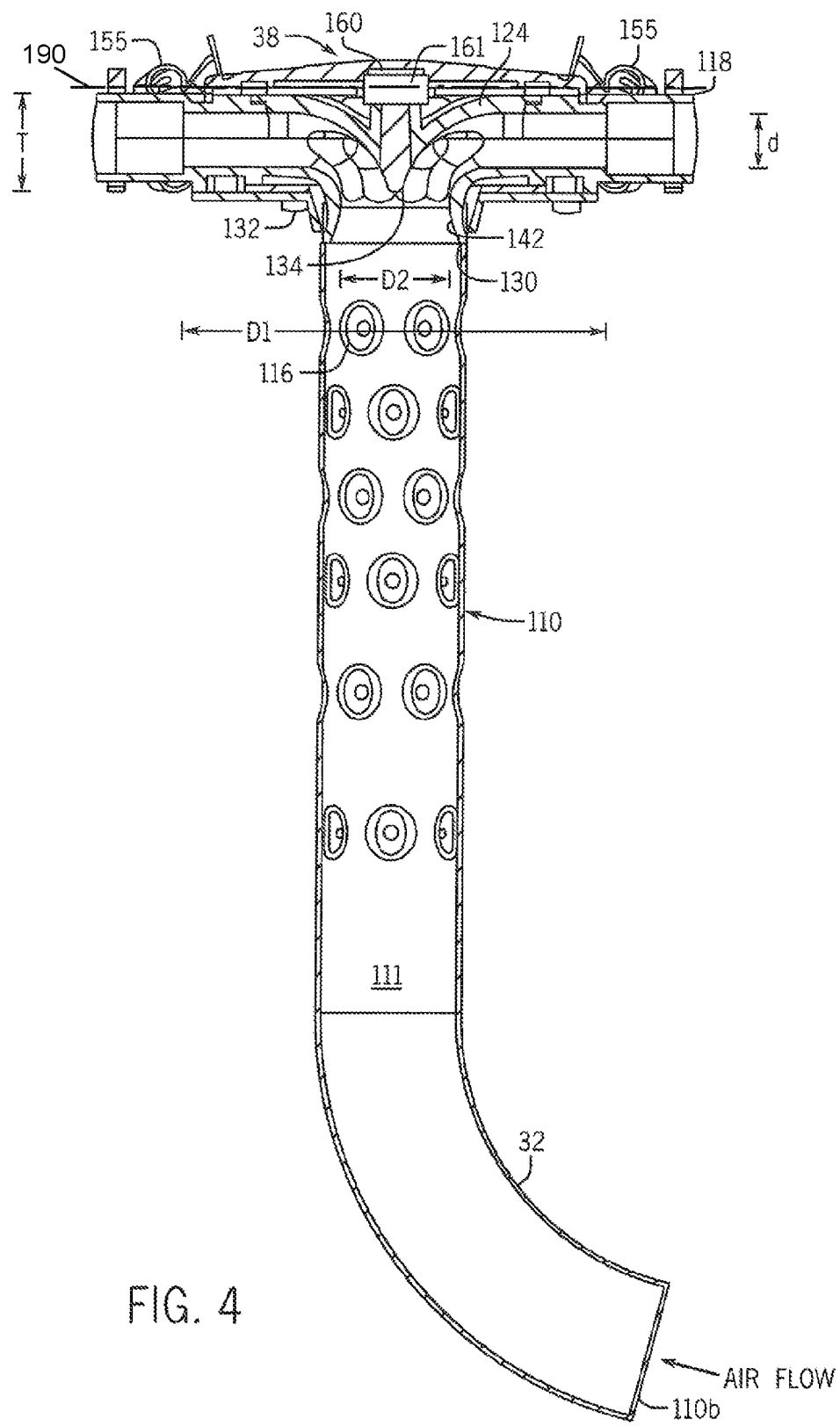
FIG. 4 is a cross-sectional view of the secondary distribution manifold of FIG. 3.
Figure 6A:
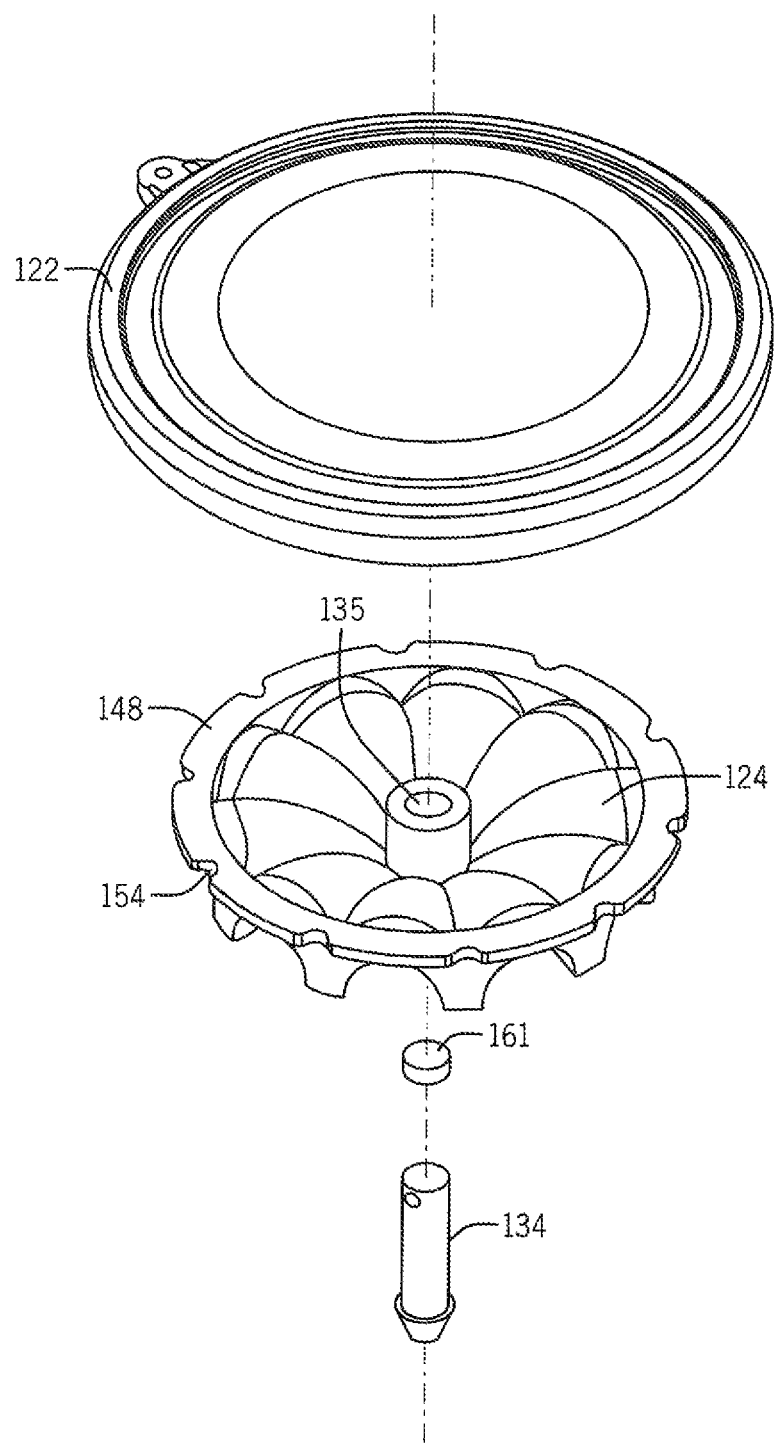
FIGS. 6A and 6B are an exploded, side elevational isometric view of secondary distribution manifold of FIG. 3.
Figure 6B:
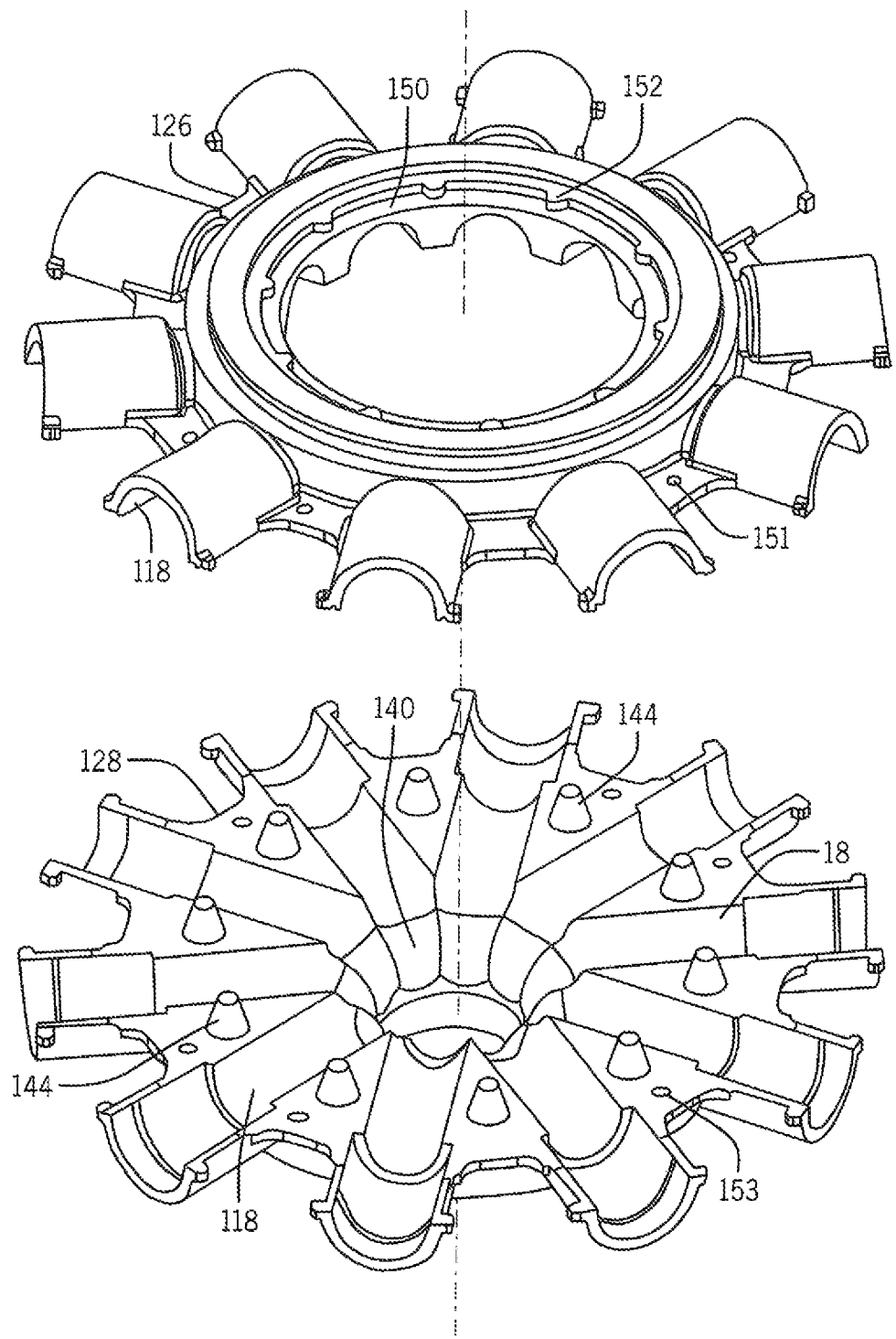

Referring to FIGS. 1 and 2, the air cart 10 includes a frame 20 to which storage compartments 22 and wheels 24 are mounted. As hereinafter described, the pneumatic distribution system 14 is configured to supply a controlled volume of product 16 from the storage compartments 22 to corresponding, individual distribution lines 32 so that the product 16 can be variably distributed to different portions of the drill 12 and different locations on the agricultural field. More specifically, the pneumatic distribution system 14 of the agricultural air cart assembly 9 may include a plurality of distribution units 17 arranged in a side-by-side relationship along the underside of air cart 10, FIG. 5.

As seen in FIG. 5, each of the distribution units 17 includes a fan 18 for generating an air flow directed through a corresponding distribution line 32. The product 16 supplied to the distribution line 32 from the storage compartment 22 becomes entrained in the air flow through the distribution line 32 and is carried by the air flow downstream, as hereinafter described. As is conventional, each of the distribution units 17 also includes a meter wheel driven by a motor via linkage such as a transmission, a drive belt or the like. The meter wheel includes an intake communicating with the storage compartment and an exit communication with the distribution line 32. By rotating the meter wheel at a desired speed, a desired quantity of product 16 from the storage compartment 22 is supplied to the distribution line 32. It is noted that operation of the meter wheel may be individually controlled by the controller (e.g. controller 174) such that the meter wheel may be operated at different rotational speeds, thereby selectively controlling the amount of the product 16 supplied to the distribution line 32.

It is intended for fan 18 to generate the air flow in distribution lines 32 so as entrain the product 16 supplied to the distribution line 32, as heretofore described. The rotational speed of fan 18 may be constant or may be controlled by controller 174, as hereinafter described. Each distribution line 32 is operatively connected to the input of a primary distribution manifold 30, FIG. 8. The primary distribution manifold 30 further includes a plurality of outputs, each of which is in communication with a corresponding secondary distribution manifold 38 via primary distribution lines 32a. Restriction elements 180 are provided at each of the plurality of outputs of the primary distribution manifold 30 and are operatively connected to controller 174, for reasons hereinafter described. The restriction elements 180 are selectively controllable by controller 174 to adjust the volume of air flowing into primary distribution lines 32a from corresponding outputs of primary distribution manifold 30. As is conventional, each primary distribution manifold 30 collects the product 16 entrained in the air flow received at the input thereof and causes the entrained product 16 to be distributed along primary distribution lines 32a to secondary distribution manifolds 38. As heretofore described, each secondary distribution manifolds 38 collects the product 16 received at the input thereof and causes the product 16 to be distributed among secondary distribution lines 40 to corresponding row units 36, wherein the product 16 is deposited in the furrow cut thereby.

Figure 8:
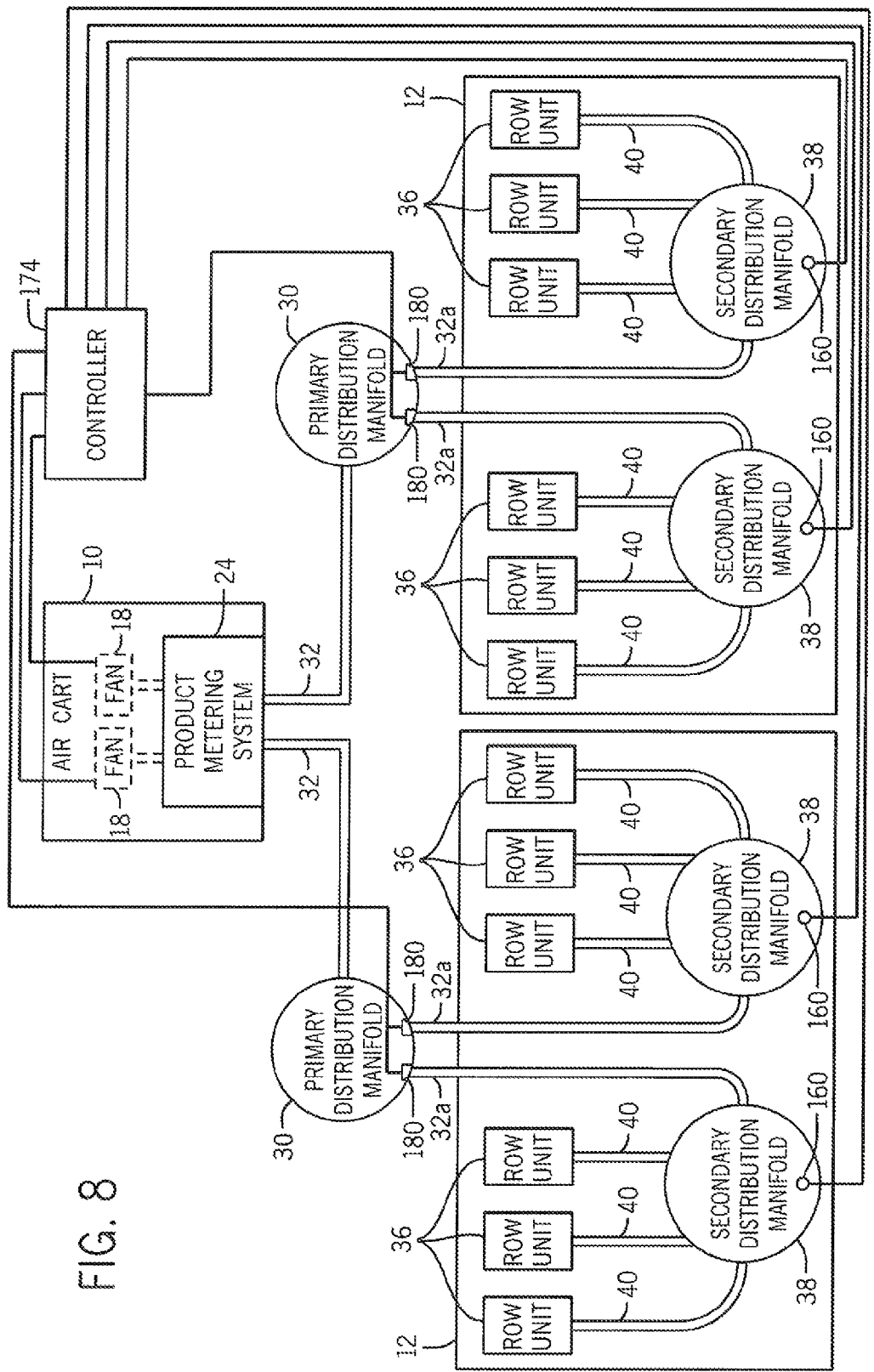
FIG. 8 is a schematic of a product delivery system including the air flow control of the present invention.

Each secondary distribution manifold 38 has a single opening or input for receiving the product 16 entrained in the air flow in a corresponding primary distribution, line 32a and a plurality of outputs, each of which is in communication with a corresponding secondary distribution line 40. Each secondary distribution manifolds 38 collects product 16 received at the inlet 110b thereof and causes the product 16 to be distributed among a plurality of secondary distribution lines 40. While three secondary distribution lines 40 are depicted in FIG. 8 as emanating from each secondary distribution manifold 38, any number of secondary distribution lines 40 may be used without deviating from the scope of the present invention.

Referring to FIGS. 3-7, secondary distribution manifold 38 includes an upright conveyor tube 110 having a distribution head 112 mounted to upper end 110a thereof. The lower end defines an inlet 110b of secondary distribution manifold 38 for receiving product 16 via primary distribution line 32a. Optional inwardly directed and spaced apart projections 116 are disposed along the inner surface 111 of vertical portion 113 of conveyor tube 110. It is intended for projections 116 to impart a controlled degree of turbulence in the upwardly moving air flow through vertical portion 113 of conveyor tube 110.

The distribution header 122 is symmetrical about a central vertical axis and includes four main parts namely, top cover 122, flow deflecting insert 124, top section 126 and a bottom section 128. FIG. 5. Top and bottom sections 126 and 128, respectively, as well as, flow deflector 124 are preferably molded from a polyurethane glass filled plastics material. As is known, polyurethane glass filled plastics resist wear due to abrasion resulting from the materials being handled and provide for economy in the manufacturing processes.

Distribution head 112 is provided with a centrally located flow inlet spigot 130 which is snugly received in the upper end 110a of the conveyor tube 110. Radial flange 131 fixed to the upper end of conveyor tube 110 is provided with spaced apertures through which fasteners 133 extend into distribution head 112 to secure the latter in position on the upper end 110a of conveyor tube 110. Inlet spigot 130 is integrally formed with the bottom section 128 of distribution head 112. Top and bottom sections 126 and 128, respectively, of distribution head 112 together define a plurality of radially outwardly projecting outlet ports 118. Outlet ports 118 extend in equally angularly spaced relationship to each about the vertical central axis of symmetry of distribution head 112. The outlet end portions 119 of outlet ports 118 all lie in a common plane along axis 190 which is perpendicular to the central axis of distribution head 112.

It is intended for flow divider insert 124 to divide the incoming air flow received via the flow inlet 130 into substantially equal parts while directing the divided portions of the air flow outwardly through the respective outlet ports 118. Accordingly, distribution head 112 includes flow divider chamber 132 defined within distribution head 112 with the above-noted flow deflector insert 124 being seated within the top section 126 of the head. The flow deflector 124 is provided with a downwardly directed nose 134 pinned in central passage 135 in through flow deflector 124 and accurately centered on the vertical central axis of distribution head 112. Flow deflector 124 is also provided with a plurality of radially arranged flow confining ridges 136 separated by smoothly contoured valleys 138 each of which is associated with a respective one of the outlet ports 118. Flow confining ridges 136 commence immediately downstream of the nose 134 and are initially very shallow. As ridges 136 curve gradually around from combined radial and axial directions adjacent the nose 134 into generally radial directions, the contoured valleys 138 between ridges 136 gradually become deeper such that the contoured valleys 138 in the flow deflector insert 124 ultimately coincide or match up with the interior surfaces of the outlet port portions 118 defined by top section 126 of distribution head 112.

Bottom section 128 of distribution head 112 is also provided, immediately downstream of the flow inlet spigot 130, with a plurality of shallow concave transition surfaces 140, each of which leads from the flow inlet spigot 130 into a respective one of the radially disposed outlet port portions 118 defined in bottom section 128. Additionally, the interior surface 142 of the flow inlet spigot 130 gradually tapers inwardly in the direction of the air flow to accelerate and centre the flow before it meets the flow deflector insert 124. All of these features serve to ensure that the upwardly moving air flow entering distribution head 112 via the flow inlet spigot 130 is well centered on the central axis which helps ensure the air flow is divided into equal parts and is at the same time smoothly swung around from a vertical direction into substantially horizontal directions and passed in generally equal parts with a minimum of flow restriction outwardly through the respective outlet ports 118.

In order to ensure that flow deflecting insert 124, top section 126 and bottom section 128 of distribution head 112 are accurately fitted together, bottom section 128 is provided with a plurality of conical projections 144 disposed in radially spaced apart relationship and each adapted to enter into a correspondingly shaped recess located in the top section 126 of distribution head 112. In addition, in order to ensure accurate positioning of flow deflector insert 124, the outer perimeter of flow deflector insert 124 is provided with an outwardly projecting annular ledge 148. Ledge 148 is snugly received in a shallow annular step-like recess 150 provided in top section 126 of distribution head 112. This arrangement ensures that flow deflector 124 is accurately centered within the top section 126.

Furthermore, to ensure that flow deflector 124 is accurately positioned angularly, the step-like recess 150 in top section 126 is provided with angularly spaced apart semicircular tabs 152 which co-operate with correspondingly sized semi-circular notches 154 provided in outwardly projecting flange 148 of flow deflector 124. Fasteners (not shown) extending through aligned apertures 151 and 153, respectively, in top and bottom sections 126 and 128, respectively, to secure these sections together. Flow deflector insert 124 is held in place by top cover 122 which, in turn, is secured by spaced apart spring clips 155 of suitable design.

While distribution head 112 is provided with ten outlet ports 118 depicted embodiment, it can be appreciated that the number of outlet ports 118 can be varied depending upon the circumstances. Commonly used distribution head embodiments employ anywhere from seven to twelve equally angularly spaced outlet ports which are sized to ensure that the flow velocity outwardly of each outlet port is sufficient as to ensure continued entrainment of the materials being conveyed thus assisting in avoiding clogging problems. It is further noted that in its assembled configuration, distribution head 112 can have many different dimensions. By way of example, it is contemplated for the distribution head to have a diameter "D1" of approximately 7.5 inches; a radial port inner diameter "d" of approximately 1.5 inches; a flow inlet inner diameter "D2" of approximately 2.5 inches; and a flow deflector top to nose tip distance "T" of approximately 1.625 inches, FIG. 4.

In order to determine the pressures with secondary distribution manifolds 38, it is contemplated to provide sensor systems 160 with respect to distribution heads 112 thereof. In aspects, sensor systems 160 may be provided within, along, or just before the distribution heads 112, so long as they are adequate to measure pressure within the distribution heads 112. By way of example, referring to FIGS. 3-4, it is contemplated for each system sensor 160 to include a first load cell 161 positioned between upper surface 134a of nose 134 and inner surface 122a of top cover 122 on the central vertical axis of the distribution head 112. First load cell 161 is also positioned in axial alignment with spring clips 155 on axis 190. First load cells 161 may take the form of a transducer which generates an electrical signal whose magnitude is proportional to pressure of the air flow received in conveyor tube 110 and distributed to outlet ports 118 by distribution head 112. The electrical signal generated by first load cell 161 may be provided directly to controller 174 or passed through an optional signal conditioning circuit (not shown) prior to receipt by the controller 174, for reasons hereinafter described.

Figure 7:
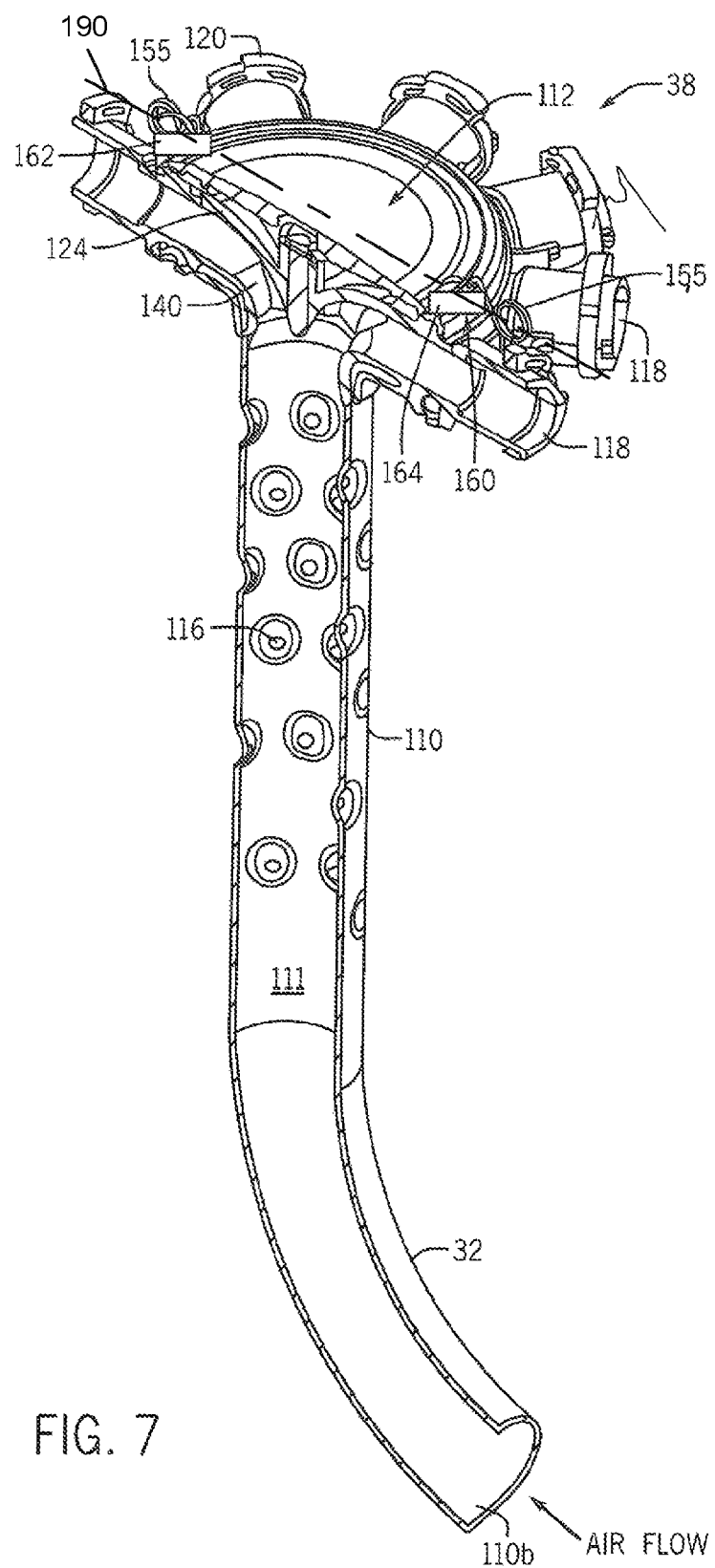
FIG. 7 is an isometric view of a cross-section of the secondary distribution manifold of FIG. 3, including an alternate arrangement for sensor system for the air flow control of the present invention.

In addition to or in the alternative, each sensor system 160 may further include a plurality of load cells, such as second and third load cells 162 and 164, respectively, positioned within the interior of distribution head 112 to provide further measurements of the pressure of the air flow with secondary distribution manifold 38, FIG. 7. By way of example, it is contemplated to position second and third load cells 162 and 164, respectively, adjacent inner surface 122a of cover 122 in axial alignment with a corresponding spring clips 155 along axis 190 and radially spaced from the central vertical axis of the distribution head 112. Again, second and third load cells 162 and 164, respectively, may take the form of a transducer which generates an electrical signal whose magnitude is proportional to pressure of the air flow received in conveyor tube 110 and distributed to outlet ports 118 by distribution head 112. The electrical signal generated by second and third load cells 161 may be provided directly to controller 174 or passed through an optional signal conditioning circuit (not shown) prior to receipt by the controller 174, for reasons hereinafter described. It can be appreciated that sensor system 160 may include additional load cells. For example, in the event that three spring clips 155 are utilized to retain top cover 122 on distribution head 112, an additional load cell may be aligned with the third spring clip and provide an electrical output signal indicative of the air flow pressure within distribution head 112 to controller 174.

Referring now to FIGS. 1-2 and 8, in operation, product 16 is loaded into storage compartment 22 of air cart 10. The tractor 8 tows the agricultural air cart assembly 9 and the drill 12 for pneumatic distribution of the product 16 through the agricultural field. Fans 18 of each distribution unit 17 are actuated so as to generate air flow in distribution lines 32. Controlled volumes of product 16 are transferred from the storage compartments 22 to corresponding, individual distribution lines 32 and become entrained in the air flows through the distribution lines 32. The primary distribution manifolds 30 receive the product 16 entrained in the air flows in distribution lines 32 and causes the entrained product 16 to be distributed along the primary distribution lines 32a to the secondary distribution manifolds 38. Each secondary distribution manifolds 38 collects the product 16 received at the input thereof and causes the product 16 to be distributed among secondary distribution lines 40 to corresponding row units 36, wherein the product 16 is deposited in the furrow cut thereby.

Sensor systems 160 measures the air flow pressures in the secondary distribution manifolds 38, as heretofore described, and provides electrical output signals generated first, second and third load cells 161, 162 and 164 (hereinafter referred to collectively as electrical output signal 170) to controller 174. Controller 174, which may be a microprocessor, a microcontroller, or other programmable logic device, receives electrical output signals 170 from the sensor systems 160 determines if the air pressures in the secondary distribution manifolds 38 are consistent and within acceptable levels. If the air pressures in the secondary distribution manifolds 38 are consistent and within acceptable levels, the rotational speeds of the fans 18 are maintained and the positions of the restriction elements 180 provided at each of the plurality of outputs of the primary distribution manifolds 30 are left unchanged.

If the air flow pressures sensed by sensor systems 160 in one or more of the secondary distribution manifolds 38 connected are inconsistent with the other secondary distribution manifolds 38 and/or outside of acceptable levels, controller 174 is configured to take affirmative steps to correct the situation. By way of example, if the pressures of air flows in the secondary distribution manifolds 38 operatively connected to a first primary distribution manifold 30 are outside of acceptable levels and vary from the pressures of air flows in the secondary distribution manifolds 38 operatively connected to a second primary distribution manifold 30, controller 174 may either increase or decrease the rotational speed of the fan 18 supplying the air flow to the first primary distribution manifold 30 to bring the air pressures in the secondary distribution manifolds 38 connected to the first primary distribution manifold 30 to acceptable levels. Hence, if the sensor system 160 detects a pressure drop, the rotational speed of fan 18 may increased so to increase the volume of air to product distribution line(s) 32. If a pressure rise is experienced, the sensor system 160 may signal controller 174 to decrease the air speed and volume of an to product distribution line(s) 32.

Alternatively, if the air flows pressures sensed by sensor systems 160 in one or more of the second distribution manifolds 38 fed from a common primary distribution manifold 30 are inconsistent or outside of acceptable levels, controller 174 is configured to adjust the positions of restriction elements 180 at the outputs of the primary distribution manifold 30 associated with the one or more of second distribution manifolds 38 that are inconsistent or outside of acceptable levels. More specifically, the controller 174 selectively adjusts the position of the restriction elements 180, thereby adjusting the volumes of air flowing into primary distribution lines 32a from corresponding outputs of primary distribution manifold 30, and hence, to the one or more of second distribution manifolds 38 that are inconsistent or outside of acceptable levels. By selectively adjusting the positions of the restriction elements 180 to vary the volumes of air flowing into to the one or more of second distribution manifolds 38, the inconsistencies or the unacceptable the air flow pressures in the one or more of second distribution manifolds 38 may be corrected. It can be appreciated that this technique allows controller 174 to detect plugs in all sizes of primary and second distribution lines 32*a* and 40, respectively, in agricultural particulate material delivery system 5 by detecting by a change in pressure within secondary distribution manifold 38.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

I claim:

1. A control system for an agricultural product delivery system including a fan for generating an air flow, a primary distribution manifold in communication with the fan, a secondary distribution manifold in communication with the primary distribution manifold, and a plurality of row units in communication with the secondary distribution manifold, the control system comprising:
   a sensor disposed in the secondary distribution manifold for measuring an air flow pressure in the secondary distribution manifold and generating a signal in response to the air flow pressure in the secondary distribution manifold; and
   a controller operatively connected to the sensor and configured to receive the signal and to adjust the air flow pressure in the secondary distribution manifold in response to the signal,
   wherein the secondary distribution manifold includes a distribution head having a cover and a retainer for retaining the cover on the distribution head, and wherein the sensor is positioned within the distribution head in axial alignment with at least a portion of the retainer.

2. The control system of claim 1, wherein the secondary distribution manifold includes a distribution head extending along a central axis, wherein the sensor is disposed in the distribution head coincident with the central axis, and wherein the sensor and the portion of the retainer axially aligned are positioned in a transverse and perpendicular position relative to the central axis.

3. The control system of claim 2, wherein the sensor is a load cell.

4. The control system of claim 1, wherein the retainer includes a spring clip.

5. The control system of claim 1, wherein the secondary distribution manifold includes a second retainer for retaining the cover on the distribution head and wherein the control system further comprises a second sensor disposed in the secondary distribution manifold for measuring the air flow pressure in the secondary distribution manifold and generating a signal in response to the air flow pressure in the secondary distribution manifold, the second sensor being positioned within the distribution head in axial alignment with the second retainer.

6. The control system of claim 1, wherein the sensor is a first sensor and the signal is a first signal, and wherein the control system further comprises a second sensor disposed in the secondary distribution manifold for measuring an air flow pressure in the secondary distribution manifold and providing a corresponding second signal in response thereto, the controller being operatively connected to the second sensor and being configured to receive the signal from second sensor and to adjust the air flow pressure in the secondary distribution manifold in response to the second signal.

7. The control system of claim 6, wherein the controller is configured to at least one of increase and decrease a rotational speed of fan in response to the first and second signals.

8. The control system of claim 1, wherein the primary distribution manifold includes a restriction element selectively adjusting the volume of air flow supplied to the secondary distribution manifold, wherein the controller is operatively connected to the restriction element and being configured to adjust the volume of air supplied to the secondary distribution manifold in response to the signal in order to adjust the air flow pressure in the secondary distribution manifold.

9. An agricultural product delivery system, comprising:
   a storage container holding a product;
   a first distribution line adapted for receiving product from the storage container;
   a first fan in communication with the first distribution line, the first fan being configured such that rotation of the first fan generates an air flow in the first distribution line which entrains and carries the product downstream in the first distribution line;
   a primary distribution manifold having an inlet in communication with the first distribution line and a plurality of outlets, the primary distribution manifold configured to receive the product entrained in the air flow at the inlet and to divide the product entrained in the air flow into portions of product entrained in the air flow at the outlets of the primary distribution manifold;
   a first secondary distribution manifold having an inlet in communication with a first outlet of the plurality of outlets of the primary distribution manifold for receiving a first portion of product entrained in the air flow and an outlet in communication with a row unit;
   a first sensor disposed in the first secondary distribution manifold for measuring an air flow pressure in the first secondary distribution manifold and generating a first signal in response to the air flow pressure in the first secondary distribution manifold; and
   a controller operatively connected to the first sensor and configured to receive the first signal and to adjust the air flow pressure in the first secondary distribution manifold in response to the first signal,
   wherein the first secondary distribution manifold includes a distribution head, a cover and a retainer for retaining the cover on the distribution head, and wherein the first sensor is positioned adjacent to the cover and in axial alignment with at least a portion of the retainer.

10. The agricultural product delivery system of claim 9, wherein the first secondary distribution manifold includes a distribution head having a central axis, the first sensor being positioned in the distribution head coincident with the central axis, and wherein the sensor and the portion of the retainer axially aligned are positioned in a transverse and perpendicular position relative to the central axis.

11. The agricultural product delivery system of claim 10, wherein the first sensor is a load cell.

12. The agricultural product delivery system of claim 9, wherein the retainer includes a spring clip.

13. The agricultural product delivery system of claim 9, further comprising:
- a second sensor disposed in the first secondary distribution manifold for measuring the air flow pressure in the first secondary distribution manifold and generating a second signal in response to the air flow pressure in the first secondary distribution manifold; and
- a second retainer for retaining the cover on the distribution head; wherein the second sensor is positioned within the distribution head adjacent the cover and axially aligned with the second retainer.

14. The agricultural product delivery system of claim 9, further comprising:
- a second secondary distribution manifold having an inlet in communication with a second outlet of the plurality of outlets of the primary distribution manifold for receiving a second portion of product entrained in the air flow and an outlet in communication with a second row unit; and
- a second sensor disposed in the second secondary distribution manifold for measuring an air flow pressure in the second secondary distribution manifold and generating a second signal in response to the air flow pressure in the second secondary distribution manifold; and wherein the controller is operatively connected to the second sensor and configured to receive the second signal and to adjust the air flow pressure in the second secondary distribution manifold in response to the second signal.

15. The agricultural product delivery system of claim 9, wherein the fan has an adjustable rotatable speed and wherein the controller is configured to adjust the rotatable speed of the fan in response to the first signal.

16. The agricultural product delivery system of claim 9, wherein the primary distribution manifold includes a restriction element in communication with the first outlet thereof and being selectively adjustable to adjust the volume of air flow entraining the first portion of product exiting the first outlet and wherein the controller is operatively connected to the restriction element and being configured to adjust the restriction element in response to the first signal in order to adjust the air flow pressure in the secondary distribution manifold.

17. An agricultural product delivery system, comprising:
- a storage container holding a product;
- a primary distribution manifold having an inlet in communication with the storage container and product via a first distribution line and including at least a first outlet and a second outlet, the primary distribution manifold configured to receive the product from the storage container via the first distribution line;
- a fan in communication with the first distribution line, the fan being configured such that rotation of the fan generates an air flow in the first distribution line which entrains and carries the product downstream in the first distribution line to the primary distribution manifold, the product entrained in the air flow at the inlet of the primary distribution manifold and divided into portions of product entrained in the air flow at first and second outlets of the primary distribution manifold;
- a first restriction element in communication with the first outlet of the primary distribution manifold and a second restriction element in communication with the second outlet of the primary distribution manifold, each first and second restriction elements being selectively adjustable to adjust the volume of air flow entraining a first portion of product exiting from the first outlet and a second portion of product exiting from the second outlet;
- at least a pair of secondary distribution manifolds, each secondary manifold having an inlet in communication with one of the first outlet or the second outlet of the primary distribution manifold for receiving one of a first portion or a second portion of product entrained in the air flow via primary manifold distribution lines, one line positioned between one of the first outlet and the second outlet of the primary distribution manifold and one inlet of one of the secondary distribution manifolds, each secondary distribution manifold including an outlet in communication with a row unit, wherein each secondary distribution manifold includes a distribution head having a cover and a retainer for retaining the cover on the distribution head;
- a sensor system disposed in each of the secondary distribution manifolds for measuring an air flow pressure in each secondary distribution manifold and generating a signal in response to the air flow pressure in each secondary distribution manifold, wherein the sensor is positioned within the distribution head of each secondary distribution manifold and in axial alignment with at least a portion of the retainer; and
- a controller operatively connected to each sensor, the first and second restriction elements and the fan, the controller configured to receive each signal from each secondary distribution manifold and to adjust the air flow pressures in each secondary distribution manifold in response to each signal therefrom.

18. The agricultural product delivery system of claim 17, wherein:
- the first secondary distribution manifold includes a distribution head having a central axis, the first sensor being positioned in the distribution head and being coincident with the central axis; and
- the second secondary distribution manifold includes a distribution head having a central axis, the second sensor being positioned in the distribution head of the second secondary distribution manifold and being coincident with the central axis of the second secondary distribution manifold;
- wherein the first sensor and the second sensor and the portion of each retainer axially aligned therewith are positioned in a transverse and perpendicular position relative to the central axis.

19. The agricultural product delivery system of claim 18, wherein the first and second sensors are load cells.

20. The agricultural product delivery system of claim 17, wherein, the retainer includes a spring clip.

21. The agricultural product delivery system of claim 17, wherein the fan has an adjustable rotatable speed and wherein the controller is configured to adjust the rotatable speed of the fan in response to each signal.

22. The agricultural product delivery system of claim 17, wherein the controller is operatively connected to the first and second restriction elements and the controller is configured to adjust the first restriction element and the second restriction element in response to the signal from the sensor carried by the secondary distribution manifold connected to the first restriction element, and the signal from the sensor carried by the secondary distribution manifold connected to the second restriction element.

* * * * *